March 29, 1966 M. W. GREEN 3,243,785

SUPERCONDUCTIVE ASSOCIATIVE MEMORY SYSTEMS

Filed July 10, 1959 3 Sheets-Sheet 1

INVENTOR.
MILTON W. GREEN

BY John V. Regan

ATTORNEY

March 29, 1966 M. W. GREEN 3,243,785

SUPERCONDUCTIVE ASSOCIATIVE MEMORY SYSTEMS

Filed July 10, 1959 3 Sheets-Sheet 2

INVENTOR.
MILTON W. GREEN
BY John V. Regan
ATTORNEY

INVENTOR.
MILTON W. GREEN
BY John V. Regan
ATTORNEY 3,243,785

SUPERCONDUCTIVE ASSOCIATIVE MEMORY SYSTEMS

Milton W. Green, Menlo Park, Calif., assignor to Radio Corporation of America, a corporation of Delaware Filed July 10, 1959, Ser. No. 826,154
12 Claims. (Cl. 340—173.1)

This invention relates to memory systems, and particularly to memory systems of the random access type.

Random access memories are usually arranged so that a one-to one correspondence exists between the memory addresses and a set of binary selecting numbers. Such memories provide advantages, for example, in operating speed and flexibility.

During the operation of the memory, the information flow to and from the various memory addresses is controlled by the different numbers of the selecting number set. The memory is programmed so that the contents and addresses of the information units are known during each operating step which includes writing into and reading out of the memory. If the address of a desired unit of information is not known, the memory must be searched sequentially address-by-address until either the desired unit is found, or the entire memory is searched to determine its absence.

The usefulniess of random access memory systems would be greatly enhanced by providing means for determining in a single step whether or not a given unit of information is stored in the memory. Also, uses can be readily visualized for a memory system capable of matching given segments of a unit of information to determine at one step whether or not any stored unit has corresponding segments. For example, it may be desired to determine whether or not information relative to a known name, a known address, a known policy number, etc., is stored in the memory. Random access memories of the type referred to would be especially useful, for example, in inventory type operations, table look-up type operations, sorting operations, and other like operations.

It is an object of the present invention to provide improved memory systems of the type referred to above.

It is another object of the invention to provide a novel memory unit of the superconductive type.

Another object of the invention is to provide improved memory systems of the random access type having greater flexibility in use and efficiency in operation.

Still another object of the present invention is to provide improved memory systems in which the entire contents of the memory, or desired portions of the memory, may be interrogated in a single or successive operations.

According to the present invention, superconducting storage elements are used as storage elements in the memory. The superconducting elements are arranged to provide random access to any desired memory location for storing information in the memory. Each of the storage elements is arranged to provide non-destructive read-out of its stored information. A set of interrogation conductors and a set of sensing conductors are coupled to different groups of the superconducting elements. The sensing and the interrogation conductors are interconnected in a logical fashion such that a set of interrogation signals applied to the interrogation conductors causes an output signal to be produced only when a corresponding set of information signals is presently stored in the memory.

Figure 1:
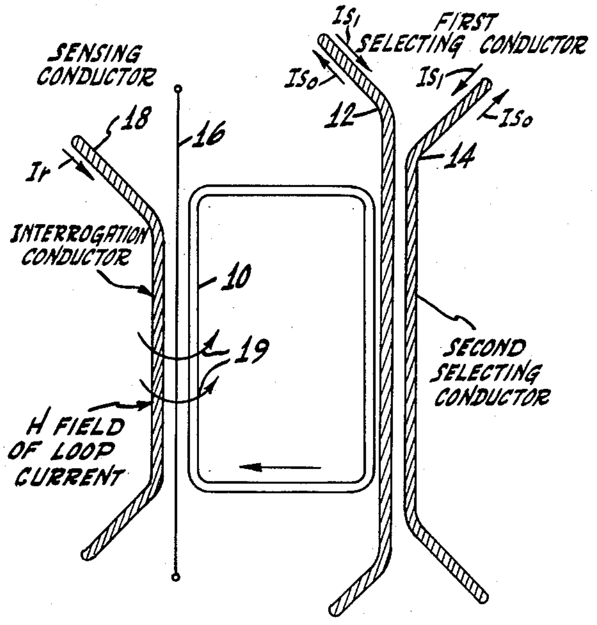
FIG. 1 is a schematic diagram of a memory element according to the invention.

Binary information is represented in the loop 10 of superconducting material of FIG. 1 by the two directions of current flow therein. A binary "1" digit is represented by current flow in one direction, for example, the clockwise direction, and a binary "0" is represented by current flow in the counterclockwise direction. The loop 10 is made of a superconducting material having a relatively high critical magnetic field, for example, lead. The loop 10 is elongated in the lengthwise direction in order to improve the efficiency of magnetic coupling between the loop and the various operating conductors. Other shapes than the rectangular shape exemplified in FIG. 1 may be used if desired.

Figure 2:
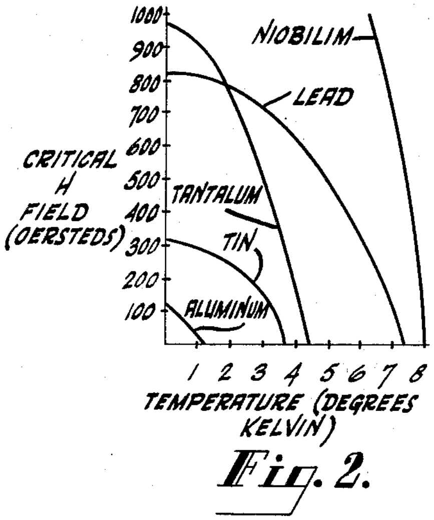
FIG. 2 is a group of graphs with each graph being a plot of critical magnetic field values as a function of temperature for various superconducting materials.

Transition curves for various superconducting materials are shown in FIG. 2. The curves of FIG. 2 each represents a plot of critical magnetic field in oersteds versus temperature in degrees Kelvin. Each material is in the superconducting state at any point beneath its characteristic curve and in the resistive state at any point above its characteristic curve. The curves themselves each represent the loci of transition points between the two states for each of the different materials.

The loop 10 (FIG. 1) may be a thin wire or a foil, or may be a conductive loop evaporated, plated, photoengraved, or etched, etc. on a suitable substrate such as glass. Placed in close proximity to one side of the loop 10 are first and second selecting conductors 12 and 14 of superconducting material having a higher critical magnetic field than that of the loop 10. For example, the selecting conductors 12 and 14 may be of niobium material. Placed in close proximity to the other side of the loop 10 is a sensing conductor 16 and an interrogation conductor 18. The sensing conductor 16 is placed between the loop 10 and the interrogation conductor 18. The sensing conductor 16 is made of a superconducting material having a relatively low critical magnetic field with respect to the critical field of the loop 10 and the interrogation conductor 18. For example, the sensing conductor 16 may be of tin, and the interrogation conductor 18 may be of niobium. Preferably, though not necessarily, the sensing conductor 16 has a cross-sectional area which is small compared with the cross-sectional area of the loop 10 and the interrogation conductor 18. By using a small cross-sectional area for the sensing conductor 16, the system operation is improved, as described more fully hereinafter.

Information is stored in a loop 10 by applying currents of suitable polarity concurrently to the first and second selecting conductors 12 and 14. For example, positive polarity selecting currents, in the direction of the arrows $I_{S1}$, may be used to induce the clockwise current flow in the loop 10 to store a binary "1" digit. The plot of the amplitude of the selecting currents against time may be of trapezoidal, rectangular, or other suitable shape. The pair of selecting currents together generate sufficient net magnetic field to change the loop 10 to the resistive state. During the falling portion of the selecting currents, their net generated field becomes less than the critical field of the loop 10 which thereupon reverts to the superconducting condition. The desired clockwise loop 10 current is established, or "trapped" in the loop 10 upon termination of the selecting currents. Note that any one selecting current alone does not generate a sufficient magnetic field to cause the loop 10 to change to the resistive state.

An opposite polarity current, representing the binary "0" digit, is established in the loop 10 by applying opposite polarity selecting currents $Is_0$ concurrently to the first and second selecting conductors 12 and 14.

The system is operated in a suitable cryogenic environment such that the sensing conductor 16 is in the superconducting condition in the absence of any loop 10 current. For example, the temperature, using the materials above referred to, is maintained near absolute zero. A loop 10 current applies a magnetic field to the sensing conductor 16 and to the interrogation conductor 18, as indicated by the arrows 19. Because the sensing conductor 16 has a relatively low critical field, the loop 10 magnetic field maintains the sensing conductor 16 in its resistive state. The interrogation conductor 18, however, remains in the superconducting state because of its relatively high critical field. Accordingly, the fact that a binary digit is stored in the loop 10 is indicated by whether or not the sensing conductor 16 is in the resistive state. However, at this point, the state of the sensing conductor 16 does not indicate which one of the two binary digits is stored, since either direction of loop current causes the sensing conductor to be resistive.

Figures 3, 4:
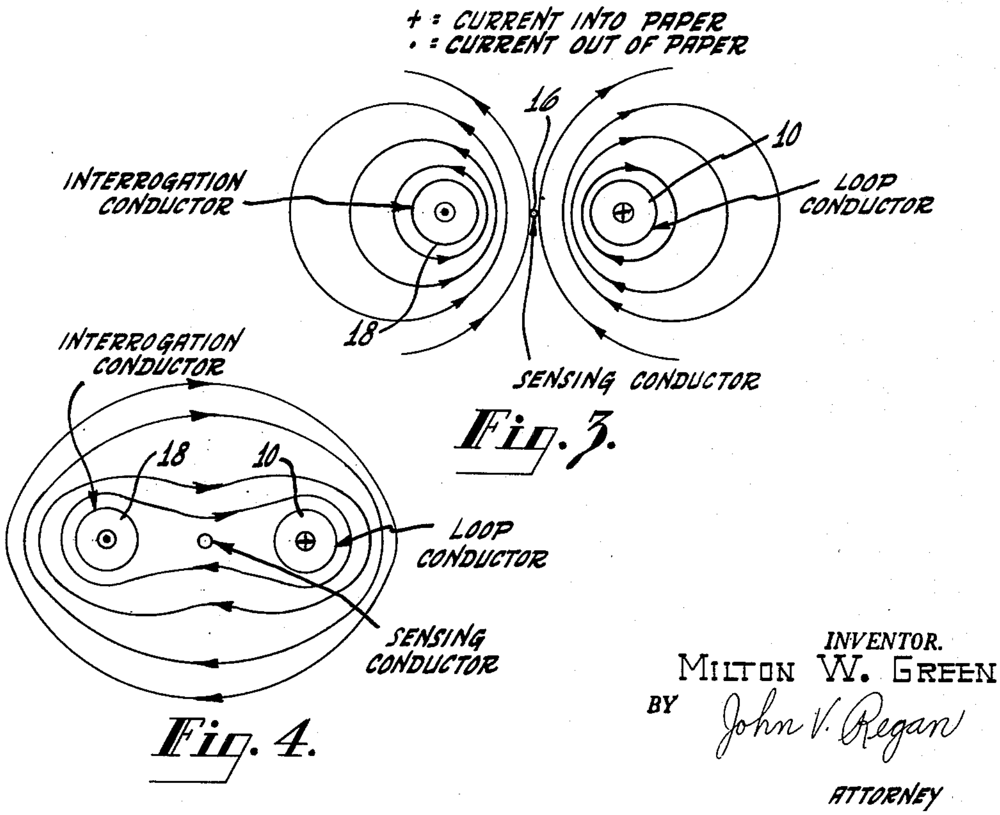
FIGS. 3 and 4 are each schematic diagrams of magnetic fields useful in explaining the operation of the element of FIG. 1.

The state of the stored digit, "1" or "0," is ascertained by applying a suitable current to the interrogation conductor 18. For example, a positive polarity interrogation current, in the direction of the arrow I*r*, generates a magnetic field which at the sensing conductor 16 in between the conductors 10 and 18, aids the magnetic field generated by a clockwise loop current. Thus, an increased field in the direction of the field due to the loop current is applied to the sensing conductor 16, which, therefore, remains in the resistive state. The aiding fields generated by the clockwise loop current and the positive interrogation current are indicated schematically in FIG. 3. However, the field generated by the positive interrogation current I*r* opposes the field generated by a counterclockwise loop 10 current at the sensing conductor 16. The opposing fields generated by the positive interrogation current I*r* and the counterclockwise loop current are indicated schematically in FIG. 4. Thus, in the case of a counterclockwise loop current, the net field applied to the sensing conductor 16 is less than the required critical value and the sensing conductor 16 changes to the superconducting state.

Accordingly, by using any suitable means to measure the resistance of the sensing conductor 16 during the interrogation operation, the storage of the binary "1" and "0" digits is determined or read-out without changing the direction of loop 10 current flow. The amount, but not the direction, of current flow in the loop 10 may be reduced somewhat during the interrogation operation. This reduction occurs because the loop current changes in a direction tending to maintain a constant flux in the vicinity of the loop conductors. However, any changes of loop current induced during the interrogation operation are reversible, and after the end of any interrogation operation, the loop current returns substantially to its initial amplitude.

In summary, the system of FIG. 1 provides a superconductive storage element with means for reading the stored information nondestructively. Note also that during the sensing of the stored information, the element operates as a logical "and" gate. That is, the sensing conductor 16 changes to its superconducting state when and only when an interrogation signal and a loop current of proper polarity are present at the same time.

The non-destructive read-out properties and the logical gating properties present in the storage element are used in the improved random access memory systems described hereinafter.

Figure 5:
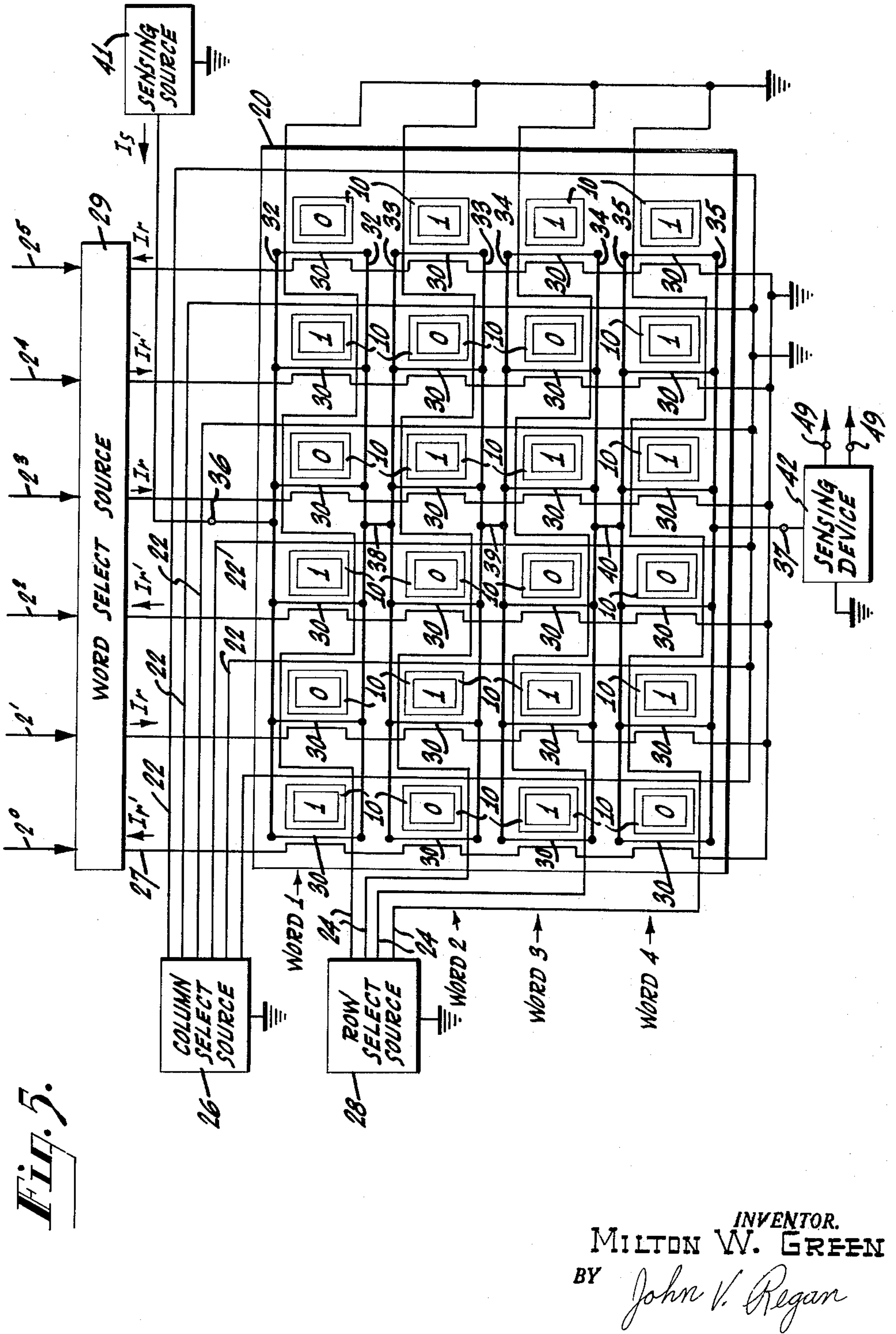
FIG. 5 is a schematic diagram of the memory system according to the invention using a plurality of the elements of FIG. 1.

For convenience of drawing, the memory system 20 of FIG. 5 is shown as a 4×6 array of the memory elements of FIG. 1. It is understood, however, that any suitable size memory having "*n*" rows and "*m*" columns ("*n*" equal, or unequal to "*m*") may be used. The array 20 is used to store four binary words each of six binary digits in length. Each of the four words is stored in the memory elements along a different array row; and each of the six digits of a word along a row are stored in a different memory element of the six array columns. The memory elements are each arranged in the manner described for the system of FIG. 1. The six column selecting lines 22 and the four row selecting lines 24 are used for the first and second selecting lines of the individual memory elements. Any one element, however, is selected by a different pair of one column line 22 and one row line 24. The six column lines 22 are connected at one end to a different one of six outputs of a column select source 26. The four row lines 24 are connected at one end to a different one of four outputs of a row select source 28. The column and row lines 22 and 24 are each terminated at a point of common reference potential, indicated in the drawing by the conventional ground symbol. The six sensing conductors 30 of the first row of memory elements are connected in parallel with each other across a first pair of word buses 32. The six sensing conductors 30 of the second, the third, and the fourth rows of memory elements are connected in parallel across second, third and fourth pairs of words buses 33, 34 and 35, respectively. Three series conductors 38, 39 and 40 connect the word buses in a serial-parallel circuit arrangement between first and second junction points 36 and 37. The first junction point 36 of the series-parallel circuit is connected to an output of a sensing source 41. The sensing device 42 may be any suitable resistance measuring device capable of distinguishing between a relatively high and a relatively low value of resistance and providing an appropriate output signal. The second junction point 37 of the series-parallel circuit is connected to an input of the sensing device 42. The sensing source 41, the column and row select sources 26 and 28, and the sensing device 42 each is provided with a ground connection. The sensing device 42 is provided with a pair of output terminals 49. The word connecting links 38, 39 and 40 and the horizontal bus lines 32, 33, 34 and 35 may be of any suitable material such as niobium, and preferably, each link and bus line remains in the superconducting state during the operation of the memory.

During operation, the array 20 is maintained in a suitable cryogenic environment such that each of the components assumes its superconducting state at the operating temperature in the absence of a penetrating magnetic field. The column and row select sources 26 and 28 are operated in conventional fashion to store each of the different binary words in the different array rows. The various sources themselves may be cryogenic devices, for example, devices similar to those described in Patent No. 2,832,897, issued April 29, 1958, to Dudley A. Buck. The column and row select sources 26 and 28 may be operated in coincident fashion to store the desired word, digit-by-digit in the selected row. Other known writing methods may be used to store the desired word in the selected row.

Assume, for example, that the four stored words in the memory have the sets of binary digits, as indicated by "1" and "0" numerals in the respective storage elements of the array 20. Assume, also, that for any suitable purpose it is to be determined whether a desired word 010101 is actually stored in the memory. In such case, the word select source 29 is operated under the control of the six binary digits $2^0$–$2^5$ of the desired word to apply positive interrogation currents $I_r$ to the second, the fourth and the sixth interrogation lines 27 which correspond to positions of the desired word having a binary "1" therein. Opposite polarity interrogation currents $I_r'$ are applied to the first, the third and the fifth interrogation lines 27 which correspond to positions in the desired word having a binary "0" therein. Recall that prior to the application of any interrogation currents all the sensing conductors 30 are maintained in the resistive state due to the currents flowing in the storage elements themselves. The interrogation currents $I_r$ change those of the sensing conductors 30 which are coupled to memory elements storing a binary "0" digit of the second, fourth and sixth columns to the superconductive state. Thus, in the second column, the sensing conductors 30 of the second, third and fourth rows remain in the resistive state. The sensing conductor 30 of the first row and the second column changes to the superconductive state. In the first column, the interrogation current $I_r'$ causes the first and third sensing conductors 30 to change to the superconductive state, and the second and fourth sensing conductors 30 remain in the resistive state. In similar manner, the interrogation currents $I_r$ and $I_r'$ change or do not change the sensing conductors 30 adjacent the memory elements storing the "0" and "1" digits, respectively, of the third through sixth columns to the superconducting state. Thus, while the interrogation currents $I_r$ and $I_r'$ are applied to the interrogation conductors 27, all the rows, except the second, have one or more sensing conductors 30 in the superconducting state. The second row of sensing conductors 30, are all in the resistive state.

At any desired time after any transient effects due to the interrogation signals have died out, a sensing current $I_s$ is applied across the series-parallel connected word buses 32–35 by the sensing source 41. The superconducting sensing conductors 30 of the first, third, and fourth rows provide a short-circuited path for the sensing current $I_s$. The sensing conductors 30 of the second row, however, provide a resistive path for the sensing current $I_s$, since each of those sensing conductors 30 is in its resistive state. The resistive voltage drop across the second pair of word buses 33 is detected by the sensing device 42 which thereupon provides an output signal of one type across the output terminals 44. The one type output signal indicates that the desired word 010101 is presently stored in the memory.

If each of the stored words in the memory differs by one or more digits from corresponding digits of the desired word, a superconducting path is provided across all the pairs of word buses 32–35. In such case, the sensing device 42 recognizes the absence of any appreciable resistance presented to the sensing current $I_s$ in the memory. The sensing device 42 then provides another type output signal. Note that the output signal from the sensing device 44 is in the form of a "yes" or "no" type answer and indicates that the desired word is present or absent from the memory.

The presence or absence of any other word in the memory can be determined in similar manner by first operating the word select source 29 to apply the corresponding interrogation currents $I_r$ and $I_r'$ to the interrogation conductors 27. Then the sensing source 41 current $I_s$ causes the sensing device 42 to provide an output signal indicating the presence or the absence of the desired other word in the memory.

The sensing operation of the system of FIG. 5 is a parallel type with respect to the individual digits of the desired word. Certain systems operate serially with respect to the individual digits of a word. That is, the signals corresponding to the individual digits are applied sequentially in a determined order, for example, beginning with the highest order digit. The sensing operation as described above is transistory in nature. However, by providing auxiliary storage for the individual information digits the sensing operation can be used with serial type systems.

Figures 6, 7:
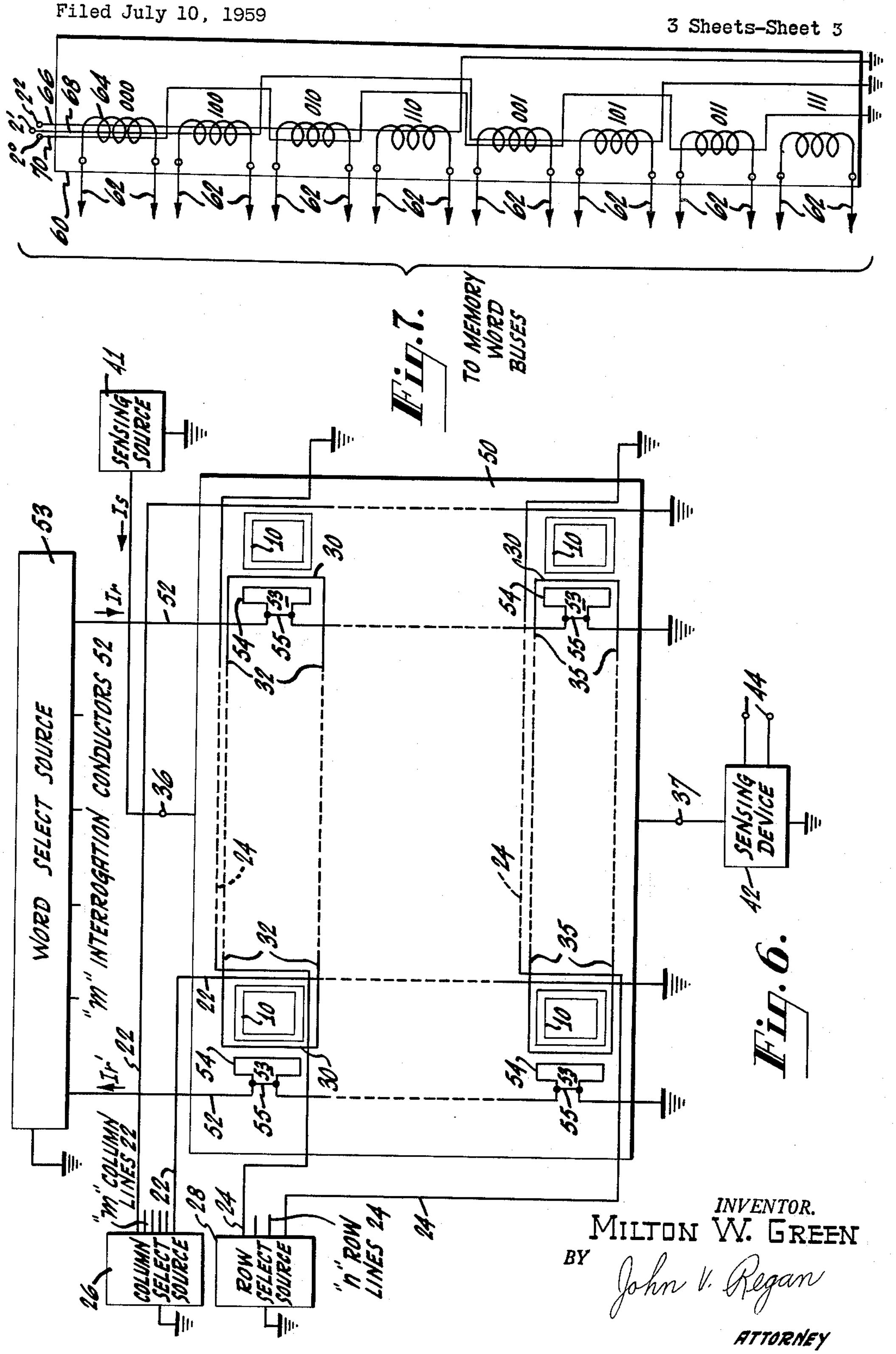
FIG. 6 is a schematic diagram of another embodiment of a memory system according to the present invention.
FIG. 7 is a schematic diagram of a circuit for determining the address of located information and useful in connection with the memory systems of FIGS. 5 and 6.

The memory system 50 of FIG. 6 is arranged to operate with either parallel or serial systems. For convenience of drawing, only the storage elements at the four corners of the *n* by *m* memory array 51 are shown in detail. A separate auxiliary storage element 53 is provided at the location of each superconducting storage loop 10. The remaining elements of the system of FIG. 6 are similar to corresponding elements of FIG. 5. A word select source 53 is used to apply the *m* separate interrogation signals $I_r$ or $I_r'$ simultaneously or sequentially to the *m* interrogation conductors 52. The auxiliary storage elements 53 are formed by individual current conducting loops formed in each of the interrogation conductors 52 at the locations of the storage loops 10 of each array column. Each auxiliary storage element 53 includes two portions. A first looped portion 54 of the interrogation conductor 52 has a side located in close proximity to the sensing conductor 30 of the corresponding storage loop 10. By close proximity is meant that magnetic field generated by a current flow in the looped portion 54 couples the adjacent sensing conductor 30, as described more fully hereinafter. The second portion of the auxiliary storage element 53 is a bridge 55 of superconducting material different from the material of the interrogation conductor 52. The bridge 54 may be of superconducting material having a lower critical field than that of the interrogation conductor 52. An article by M. J. Buckingham, entitled "A Superconducting Memory and Switching Element for Computers," and appearing in a text "Low Temperature Physics & Chemistry," published by the University of Wisconsin Press, 1954, describes such an arrangement of a storage device. Also, the bridge 55 may be of superconducting material having a higher critical field than that of the interrogation conductor 52 as described in copending application Serial No. 826,337, entitled "Superconducting Memory System," and filed by the present applicant on July 10, 1959, now Patent No. 2,983,889. All the auxiliary storage elements 53 in any one column are connected in series with each other by the interrogation conductor 52 of that one column.

In operation, an interrogation current $I_r$ applied to an interrogation conductor 52 causes a clockwise persistent current flow in each of the auxiliary storage elements 53 connected to that interrogation conductor 52. The opposite polarity interrogation current $I_r'$ causes a counterclockwise persistent current flow in each auxiliary storage element 53 connected to an interrogation conductor 52 carrying the current $I_r'$. One explanation of the physical reasons why the two senses of persistent current flow are established in the closed loops 53 by the two currents $I_r$ and $I_r'$ is found in the above-mentioned article by Buckingham. The clockwise loop current, due to the interrogation current $I_r$, continues to flow in an auxiliary storage element 53 after the termination of the current $I_r$ and until the opposite polarity interrogation current $I_r'$ is applied to establish a counterclockwise current flow. In like manner, the counterclockwise current continues to flow in an auxiliary storage element 53 until a new interrogation current $I_r$ is applied. Accordingly, the auxiliary storage elements 53 of any one column serve to store the information as to the polarity of the interrogation current last applied to that one column. Thus, the word select source 53 can be operated to apply the individual interrogation currents $I_r$ and $I_r'$ simultaneously or sequentially to the respective interrogation conductors 52.

The current flowing in the looped portion 54 of any auxiliary storage element 53 generates a magnetic field which, in the vicinity of the sensing conductor 30, either aids or opposes the magnetic field applied to the same sensing conductor 30 as a result of the current flow in the coupled storage loop 10. Accordingly, each sensing conductor 30 located between a storage element 10 and an auxiliary storage element 53 is or is not in the superconducting condition, as explained above in connection with the system of FIG. 5. Therefore, a resistive impedance is offered to a sensing signal $I_s$, applied after the interrogation signals $I_r$ and $I_r'$, when and only when the desired word is actually stored in the memory.

The memory can be interrogated as to any other desired word in similar fashion by applying the interrogation currents corresopnding to this other word to set the corresponding currents in the auxiliary storage elements 53.

Inceased flexibility and speed of operation can be achieved by providing a means for locating the address of the information once it has been determined that it is present in the memory. Of course, the information can be located by an address-by-address search of the successive memory location. This method, however, can be time consuming where large capacity memories are used. A more efficient method is to provide a group of memory elements along each of the word locations to designate the corresponding memory locations. For example, assume a memory having a 64,000 word capacity each different word being stored along a different row of the memory elements. Assume that the information is organized so that each word differs from any other word in at least one binary digit. Such organization of data are common in business and scientific type applications. In business applications, for example, the data may be ordered according to a set of stock numbers. In scientific applications, for example, the data may be ordered according to a straight numerical arrangement. In addition to a unique identifying portion, a word may include a group of related information items. Thus, $p$ digits of a word designate the identifying portion thereof and the remaining $q$ digits of the word correspond to the related information.

For the assumed 64,000 word capacity, sixteen locator digits are sufficient to uniquely designate each of the 64,000 memory addresses. Before any information is actually stored in the memory, sixteen memory elements along each row are established in the "1" and "0" states in correspondence with each different set of the sixteen locator digits. The reading of the locator digits into the respective word lines is in the nature of a fabrication step and need not be repeated. Observe that the stored locator digits remain the same even though at various times the $p+q$ digits of the stored words change as different words are written into and read out of the same location during the memory operation. For example, at one time address 5000 may contain one policy number and its related information, and at a later time address 5000 contains another policy number and its related information. However, the sixteen locator digits for the address 5000 remain stored even though new information is repeatedly inserted into this address.

Assume that the sixteen locator digits are initially stored along the first sixteen columns of the memory. Thus, the first sixteen memory elements 10 along any word line are used for the locator digits. The remaining $p+q$ elements 10 along each word line are used for storing the information digits. During operation, the presence or absence of any stored information word is determined by interrogating the $p$ columns corresponding to the $p$ digits of the identifying portion of that word. Note that these $p$ identifying digits have no relation to the actual storage location of the word in the memory and serve merely to identify the word itself.

Assume that the sensing device provides an output signal indicating a desired word is stored in the memory. The location operation then proceeds by applying the $p$ interrogating signals corresponding to the $p$ digits of the desired word plus an additional interrogation current $I_r$ to the first column line of the memory. As described above, the $I_r$ current corresponds to a binary "1" digit. Thus, each of the sensing conductors 30 of the first column which is coupled by a memory element storing a binary "1" digit remains in the resistive condition, for the reasons described above in connection with FIGS. 5 and 6. A sensing current $I_s$ is next applied and the sensing device provides a "yes" output signal only when the first locator digit of the desired word is a "1." If the first locator digit of the desired word is a "0," the sensing device provides a "no" output signal. In the "yes" case, interrogation currents $I_r$ are next applied to both the first and the second columns of memory elements in addition to the $p$ identifying signals. In the "no" case, the interrogation current applied to the first column of memory elements is changed in polarity to the current $I_r'$, and at the same time, a second interrogation current $I_r$ is applied to the second column of memory elements along with the $p$ identifying signals. After the two locator interrogation currents and the $p$ identifying currents are applied, a second sensing current $I_s$ is applied. The sensing device again provides a "yes" output only when the first and second locator digits of the address of the desired word correspond to the two applied locator interrogation currents. If the sensing device provides a "no" output, the polarity of the second locator current is reversed, and a third locator current $I_r$ is applied to the third column interrogation line. This operation is repeated until all the first sixteen columns of the memory have been interrogated. At the end of the location operation, the address of the desired word has been established by the sixteen "1" and "0" digits determined during the location operation. The memory setting circuits can then be operated in accordance with the located memory address to read out all portions of the desired word.

The located word can be read out in any suitable fashion. For example, a read-out current of one polarity applied to the row line 24 of the desired word causes separate signals to be produced in the separate column lines 22. Each of these induced signals corresponds to the digit stored in the memory element causing that induced signal. A set of "$m$" suitable sensing devices can then be used to detect the "$m$" read-out signals induced in the "$m$" column lines 22. If desired, a set of "$m$" separate read-out lines (not shown) may be coupled respectively to the "$m$" columns of memory elements to receive the read-out signals.

The address of a located word can be determined in a single step by using an encoder circuit as shown in FIG. 7. For convenience of drawing, the encoder 60 of FIG. 7 has only a small capacity and is indicated as having eight inputs and three outputs. The encoder may have any suitable number of inputs and outputs. Each of the eight inputs 62 of the encoder is connected across a different one of eight word buses of a memory system having eight rows of memory elements. The encoder 60 includes eight different selecting circuits, for example, the selecting circuits may be of the cryotron type. The above-mentioned Buck patent describes the arrangement and operation of cryotron type devices. Each of the selecting circuits has a control winding 64 having end terminals connected across the input lines 62. Three gate windings 66, 68 and 70 are coupled to the eight control coils in combinatorial fashion. The three gate windings provide a set of three output signals $2^0$, $2^1$, and $2^2$ corresponding to the activated one of the control windings 64. The first control winding 66 corresponding to the $2^2$ digit is coupled only by the first four, beginning at the top, of the control coils 64. The second gate winding 68 corresponding to the $2^1$ digit is coupled to the first and second, and the fifth and sixth control windings 64. The control winding 70 corresponding to the $2^0$ digit is coupled by the first, the third, the fifth, and the sixth control windings 64. The eighth control winding 64 does not couple any of the gate windings 66, 68 or 70.

In operation, each of the word lines of the memory provides one or more superconductive paths in parallel with a control winding 64. A desired word, when present in the memory, provides a resistive path in parallel with its associated control winding 64. When the sensing current is applied to the word lines, it divides between a control coil 64 and a parallel connected sensing conductor 30 in accordance with their resistance and inductance. Since the control coil 64 has a plurality of turns, its inductance is the higher, and substantially all the sensing current flows through the superconducting sensing conductor 30. However, in the case where the desired word is located, all the sensing conductors 30 of that word are resistive and substantially all the sensing current flows through the corresponding control coil 64.

Each of the gate windings 66, 68 and 70 is normally in the superconductive condition except when an appreciable current flows in a control coil 64 coupling that gate winding. Accordingly, when the sensing current $I_s$ flows through the first control coil 64, all three gate windings 66, 68 and 70 change from the superconductive to the resistive state during the sensing operation. When the sensing current flows through the fourth control winding 64, only the gate winding 66 is resistive, and so on for each of the other control windings 64. All three gate windings 66, 68 and 70 remain the superconducting state when the sensing current flows in the eighth control coil 64. Accordingly, during the sensing operation, assigning a "0" digit to a resistive gate winding 66–70, and a "1" digit to a superconducting gate winding 66–70, the address of the desired word is determined in a single step. Other known combinatorial arrangements of cryoelectric devices can be used to provide the desired encoding operation. For example, in larger memory systems, a pyramid of cryoelectric devices can be provided to obtain the additional address signals required.

There have been described herein improved memory systems providing non-destructive read-out of stored information and providing, in larger arrays, a means for determining the presence or absence of a stored unit of information in a simple fashion. A plurality of arrays may be stacked together to provide a three-dimensional memory system. In the latter case, sheets of superconducting material may be used to provide magnetic isolation between the different arrays thereby permitting relatively close spacing of the arrays without undesired interaction due to leakage magnetic fields generated by memory elements or operating elements.

What is claimed is:

1. In a memory system having an array of "*n*" rows and "*m*" columns of superconducting memory elements, each of said elements comprising a closed loop of superconducting material, the two directions of current flow around said loop being used to represent binary information signals, the combination comprising a plurality of sensing conductors of superconducting material, each said sensing conductor being placed adjacent to a different one of said loops, "*n*" parallel circuits each comprising the "*m*" sensing conductors of a different one of said "*n*" rows connected in parallel with each other, and means connecting said "*n*" parallel circuits in series with each other.

2. In a memory system, the combination as claimed in claim 1 the current flow in any one of said loops normally maintaining the one said sensing conductor for that said one loop in the resistive state.

3. In a memory system, the combination as claimed in claim 1 including "*m*" interrogation means for each different one of said "*m*" columns of memory elements, each of said interrogation means being placed adjacent to said "*n*" sensing conductors of that column.

4. In a memory system, the combination as claimed in claime 3, each of said interrogation means comprising a separate interrogation conductor.

5. In a memory system, the combination as claimed in claim 3, each of said interrogation means comprising "*n*" persistent current elements connected in series with each other.

6. In a memory system, the combination as claimed in claim 1 including an encoding circuit having "*n*" inputs each connected to a different one of said "*n*" parallel circuits, and having $2^n$ outputs.

7. A memory system comprising a plurality of superconducting memory elements arranged in one-to-one correspondence with the elements of an array arranged in coordinate groupings, a separate sensing conductor of superconducting material placed adjacent to each different one of said memory elements, a separate interrogation conductor placed adjacent to each different one of said memory elements, with the said sensing conductor of any one of said memory element being linked by the magnetic fields produced by any current flow in said one memory element or in the interrogation conductor adjacent to that one memory element, the individual elements along one of the coordinates of said array being used in storing the individual signals of a set of information signals, the said sensing conductors along said one coordinate being connected in a separate one of a plurality of electrical circuits, the said interrogation conductors along another of said array coordinates being connected in a separate one of a plurality of interrogation lines, each said line being indidivual to a different group of said memory elements, and means for interrogating said memory system to determine the presence or absence of a desired word comprising means for applying the set of interrogation signals corresponding to said desired word to said interrogation lines, and means for applying a sensing signal to each of said plurality of electrical circuits, a superconducting path being presented to said sensing signal when said desired word is stored in said memory, and a resistive path being presented to said sensing signal when said desired word is absent from said memory.

8. A memory system as recited in claim 7, including an encoding circuit having a plurality of inputs and a plurality of outputs, said inputs each being connected to a different one of said electrical circuits.

9. A memory system as claimed in claim 7, the sensing conductors of each said electrical circuit being connected in parallel with each other, and said electrical circuits of said plurality being connected in series with each other, the interrogation signal of any one said interrogation line applying a magnetic field to a different said sensing conductor in each different one of said plurality of electrical circuits.

10. A memory system as claimed in claim 7, said interrogation signals being applied concurrently with each other.

11. A memory system as claimed in claim 7, each of said interrogation conductors being connected in a closed loop, said interrogation lines each including a series of said closed loops, and said interrogation signals being applied sequentially.

12. A memory system comprising a plurality of superconducting memory elements, said elements being arranged in first and second groups with any one element being common to one of said first and to one of said second groups, a plurality of sensing conductors of superconducting material, each located adjacent to a different one of said memory elements, a plurality of readout circuits each including a different sensing conductor in each of said first groups, a plurality of interrogation means each located adjacent to the sensing conductors of all the elements of a different one of said second groups, means for reading the information stored in a desired one of said first groups comprising means for applying a set of interrogation signals to respective ones of said interrogation means, and means for applying concurrently with said interrogation signals a sensing signal to all said read-out circuits, said sensing signal finding one of said read-out circuits in a state different from any one of the others of said read-out circuits only when the information corresponding to said set of interrogation signals is stored in said memory.

(References on following page)

References Cited by the Examiner

UNITED STATES PATENTS

| | | | |
|---|---|---|---|
| 2,856,596 | 10/1958 | Miller | 340—166 X |
| 2,877,448 | 3/1959 | Nyberg | 340—173 |
| 2,981,933 | 4/1961 | Crowe et al. | 340—173.1 |
| 3,001,178 | 9/1961 | Buck | 340—173.1 |
| 3,061,738 | 10/1962 | Wilson | 340—173.1 |
| 3,065,459 | 11/1962 | Hunter | 340—173.1 |
| 3,082,408 | 3/1963 | Garwin | 340—173.1 |
| 3,086,197 | 4/1963 | Anderson | 340—173.1 |

OTHER REFERENCES

Pages 115 to 120, Dec. 10 to 12, 1956, "A Cryotron Catalog Memory System," by Slade and McMahon, Proceedings of Eastern Joint Computer Conference.

Pages 574 to 582, Oct. 7 to 9, 1957, "A Review of Superconductive Switching Circuits," by Slade and McMahon, "National Electronics Conference," vol. XIII.

IRVING L. SRAGOW, *Primary Examiner.*

EVERETT R. REYNOLDS, *Examiner.*

J. M. CANTOR, L. W. MASSEY, T. W. FEARS, *Assistant Examiners.*